(12) United States Patent
Dreizler et al.

(10) Patent No.: US 9,719,560 B2
(45) Date of Patent: Aug. 1, 2017

(54) ROTARY JOINT

(71) Applicant: Schaeffler Technologies AG & Co. KG, Herzogenaurach (DE)

(72) Inventors: Stephan Dreizler, Dietersheim (DE); Jorg Bauer, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/781,467

(22) PCT Filed: Feb. 27, 2014

(86) PCT No.: PCT/DE2014/200094
§ 371 (c)(1),
(2) Date: Sep. 30, 2015

(87) PCT Pub. No.: WO2014/177141
PCT Pub. Date: Nov. 6, 2014

(65) Prior Publication Data
US 2016/0032973 A1    Feb. 4, 2016

(30) Foreign Application Priority Data

Apr. 29, 2013    (DE) .................. 10 2013 207 783

(51) Int. Cl.
*F16F 7/10*    (2006.01)
*F16C 33/58*    (2006.01)
(Continued)

(52) U.S. Cl.
CPC ............ *F16C 33/585* (2013.01); *F16C 19/24* (2013.01); *F16C 35/073* (2013.01);
(Continued)

(58) Field of Classification Search
CPC ...... F16C 33/585; F16C 41/001; F16C 19/24; F16C 2226/62; F16C 35/073;
(Continued)

(56) References Cited

U.S. PATENT DOCUMENTS 6,338,566 B1    1/2002    Verdier
6,575,636 B2 *  6/2003    Dardelet ............... B23K 26/28
                                                    29/898.062

(Continued)

FOREIGN PATENT DOCUMENTS

CN    1276491 A    12/2000
CN    201180739 Y    1/2009
(Continued)

OTHER PUBLICATIONS

Chinese Office Action for Application No. 201480024049.9 dated Jan. 23, 2017.

*Primary Examiner* — Pamela Rodriguez
(74) *Attorney, Agent, or Firm* — Volpe and Koenig, P.C.

(57) ABSTRACT

A rotary joint which, in order to limit the mutual rotation of the outer bearing ring (2) with respect to the inner bearing ring (2), is provided with a raceway (11), which is limited by one or two stops (14) and in which a projection connected to the outer bearing ring engages. In order to ensure that a rotation greater than 360° is possible, the raceway is of helical design.

6 Claims, 3 Drawing Sheets

(51) Int. Cl.
*F16C 35/073* (2006.01)
*F16C 41/00* (2006.01)
*F16M 11/08* (2006.01)
*F16M 11/20* (2006.01)
*F16M 13/02* (2006.01)
*F16C 19/24* (2006.01)
*F16D 55/02* (2006.01)

(52) U.S. Cl.
CPC ............ *F16C 41/001* (2013.01); *F16D 55/02* (2013.01); *F16M 11/08* (2013.01); *F16M 11/2014* (2013.01); *F16M 13/027* (2013.01); *F16C 2226/60* (2013.01); *F16C 2226/62* (2013.01); *F16M 2200/024* (2013.01)

(58) Field of Classification Search
CPC ................. F16C 2226/60; F16D 55/02; F16M 2200/024; F16M 11/08; F16M 11/2014; F16M 13/027
USPC ........ 188/378–380; 384/504, 510, 533, 572; 74/595
See application file for complete search history.

(56) References Cited

U.S. PATENT DOCUMENTS

| | | | |
|---|---|---|---|
| 2003/0094073 A1* | 5/2003 | Ostling | F16C 23/084 |
| | | | 74/595 |
| 2009/0213596 A1 | 8/2009 | Gull et al. | |
| 2010/0092123 A1 | 4/2010 | Stölzle | |
| 2011/0019953 A1 | 1/2011 | Nuissl et al. | |
| 2012/0228454 A1* | 9/2012 | Kronung | F16C 11/10 |
| | | | 248/288.11 |

FOREIGN PATENT DOCUMENTS

| | | |
|---|---|---|
| CN | 101589241 A | 11/2009 |
| DE | 3100819 A1 | 7/1982 |
| DE | 19805208 | 8/1999 |
| DE | 19963512 | 2/2001 |
| DE | 102007057780 | 6/2009 |
| EP | 2096349 | 9/2009 |
| EP | 2325541 | 5/2011 |

* cited by examiner

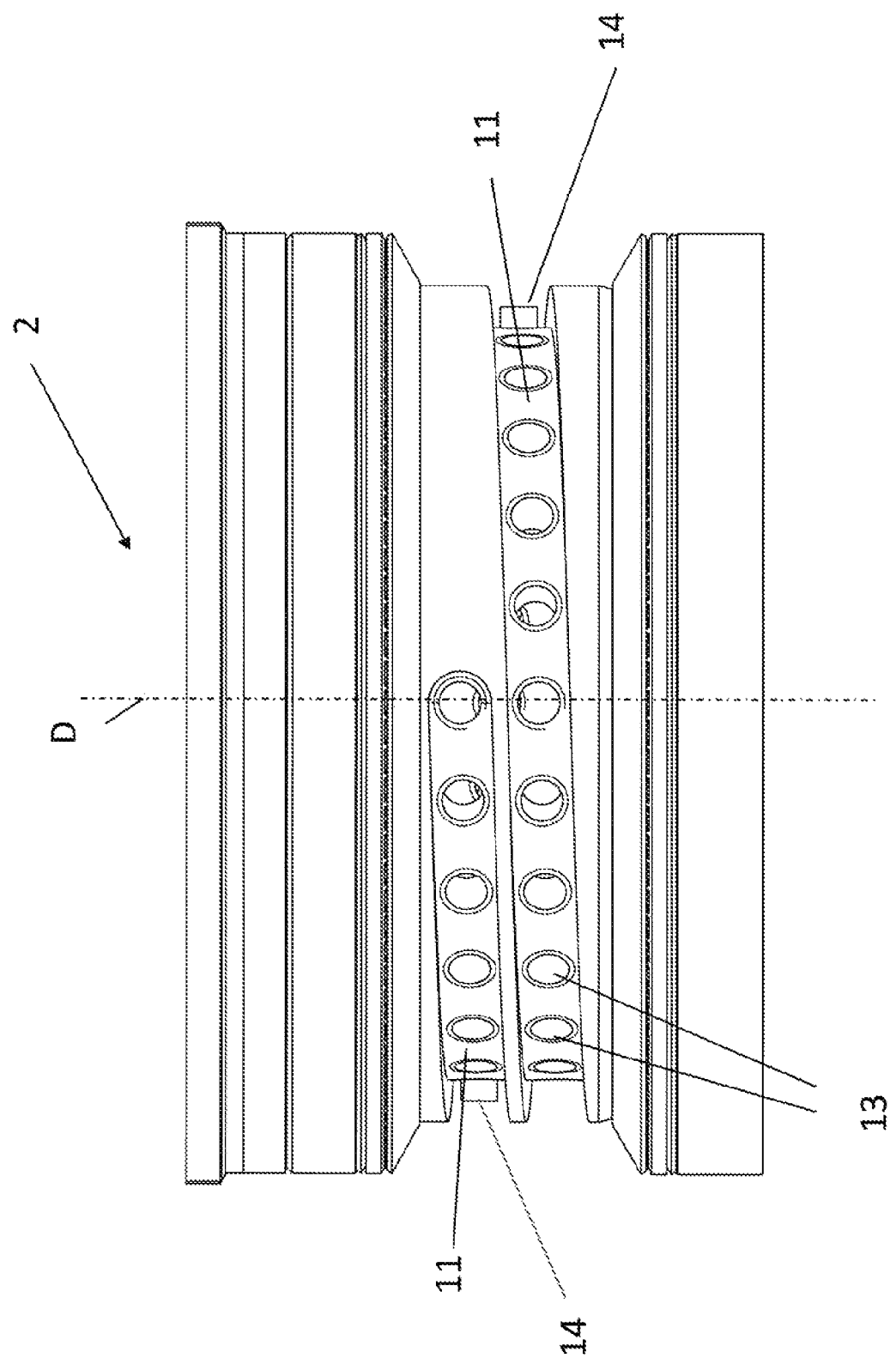

ROTARY JOINT

FIELD OF THE INVENTION

The invention relates to rotary joints, in particular, with the formation of path limiting devices for such rotary joints.

BACKGROUND

A rotary joint is known, for example, from DE 102007057780 and essentially comprises a bearing inner ring that is surrounded coaxially by a bearing outer ring. Between the bearing inner ring and bearing outer ring there are rolling bodies.

If the mutual rotation between the bearing inner ring and bearing outer ring is to be limited to a specified rotational angle, it is typical to provide a so-called path limiting device. In general, this path limiting device is realized by a round raceway provided approximately on the outer lateral surface of the bearing inner ring. This raceway is engaged by one or two stops. A tab formed, in this case, on the inner lateral surface of the bearing outer ring projects into this raceway. If the raceway is provided with two stops, the free rotation of the bearing inner ring and bearing outer ring is limited, because the tab engages in the annular space between two stops and can be moved only between these stops. As can be easily seen, the mutual distance of the two stops can very easily set the desired rotational angle. If a mutual rotation of nearly 360° is to be realized, it is sufficient to provide only one stop. In this case, the rotational angle is defined largely by the width of one stop in the circumferential direction.

It is also known to provide rotary joints with brakes that provide for an instantaneous blocking of the rotation of the bearing outer ring relative to the bearing inner ring. In the cited publication, this is realized so that a brake disk is provided on one end side of the bearing outer ring and this brake disk interacts with a brake pad that is formed on the end side of the bearing inner ring, wherein this brake pad points in the same direction as the end side of the bearing inner ring and can be moved by an electromagnet in the direction of the rotational axis against the brake disk or away from this brake disk.

However, for rotary joints with path limiting devices it has been found to be disadvantageous that the stops can only realize rotational angles of less than 360°. This means a considerable limitation in use. For example, if the tab contacts the stop, which should correspond, for this view, to a rotational angle of 360°, further turning cannot realize a desired rotational angle, for example, of 400°, due to the effect of the stop. Instead, for realizing the desired rotational angle of 400° starting from the 360° position, it must be turned back over a large rotational angle of 320°.

SUMMARY

The invention is based on the objective of providing a rotary joint that overcomes these disadvantages in its use.

This objective is achieved with one or more features of the invention. Advantageous constructions and refinements can be taken from the Detailed Description and claims that follow.

If the raceway has a helical design, rotational angles over 360° can also be realized, because the limitations caused by purely circular raceways are eliminated by this construction of the raceway.

Only for the sake of completeness it is mentioned that a helical raceway in the sense of this application is understood to be raceways that extend either in the direction of the rotational axis of the rotary joint or also perpendicular to this direction.

However, if the helical raceway extends in the direction of the rotational axis of the rotary joint, additional advantages are produced. This is especially the case if the rotary joint is provided with a brake device in which one of the two end sides of the bearing outer ring with a brake disk and the end side of the two end sides of the bearing inner ring pointing in the same direction along the rotational axis as the end side of the bearing outer ring provided with the brake disk comprises a brake pad that can be moved against the brake disk. If namely the rotary joint is provided with the brake disk mounted on the respective end sides, in contrast to an extent of the helical raceway extending in the radial direction for an axial extent of the helical raceway, no structural engagements in the brake device are required any more. In particular it is possible to use the same brake device for rotary joints that are limited in rotational angle and unlimited in rotational angle equally, which considerably simplifies the bearing mount.

A high degree of flexibility with respect to the setting of the rotational angle is achieved when the raceway is provided with a plurality of threaded holes and the stops can be screwed into the threaded holes.

BRIEF DESCRIPTION OF THE DRAWINGS

FIG. 3 a side view of a bearing inner ring according to FIG. 2.

DETAILED DESCRIPTION OF THE PREFERRED EMBODIMENTS

Figure 1:
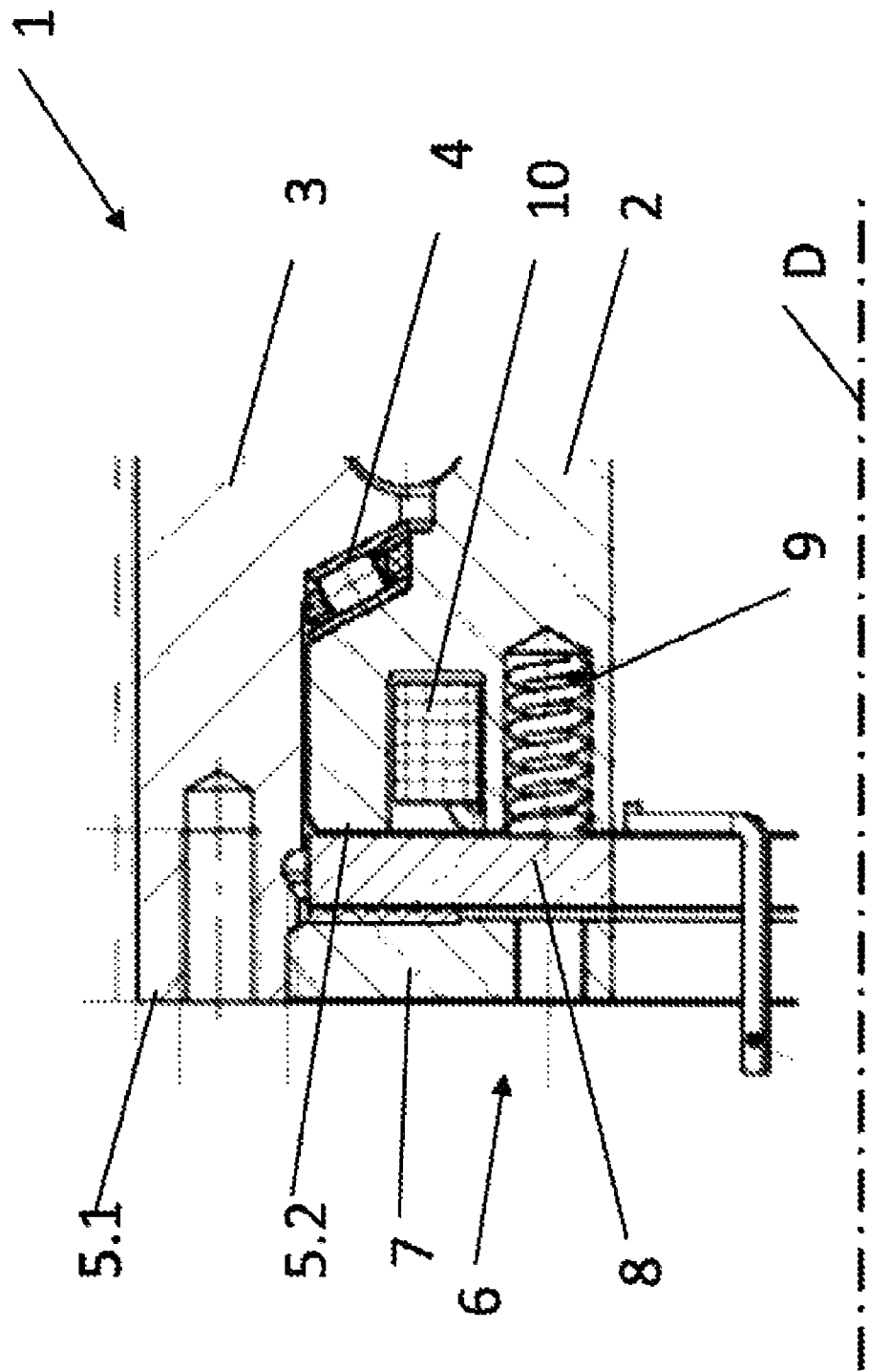
FIG. 1 a detail of a rotary joint with braking function.

The detail of the rotary joint 1 shown in FIG. 1 is essentially of a bearing inner ring 2 and a bearing outer ring 3, wherein the bearing outer ring 3 coaxially surrounds the bearing inner ring 2. Rolling bodies 4 roll between the bearing inner ring 2 and bearing outer ring 3.

The end sides 5.1 and 5.2 of bearing inner ring 2 and bearing outer ring 3 that point to the left along the rotational axis D in FIG. 1 are provided with a brake device 6. This brake device 6 is formed essentially by a brake disk 7 that is connected to the end side 5.1 of the bearing outer ring 3 and a brake pad 8 that is arranged movable in the axial direction in front of the end side 5.2 of the bearing inner ring 2. Furthermore, a spring 9 is provided that is set into the bearing inner ring 2 and presses the brake pad 8 against the brake disk 7. If the friction lock between the brake disk 7 and brake pad 8 is to be disengaged, an electromagnet 10 also set in the end side 5.2 of the bearing inner ring 2 is energized, which then acts on the brake pad 8, which is made at least partially from ferromagnetic material, and moves this brake pad to the right in FIG. 1.

Figure 2:
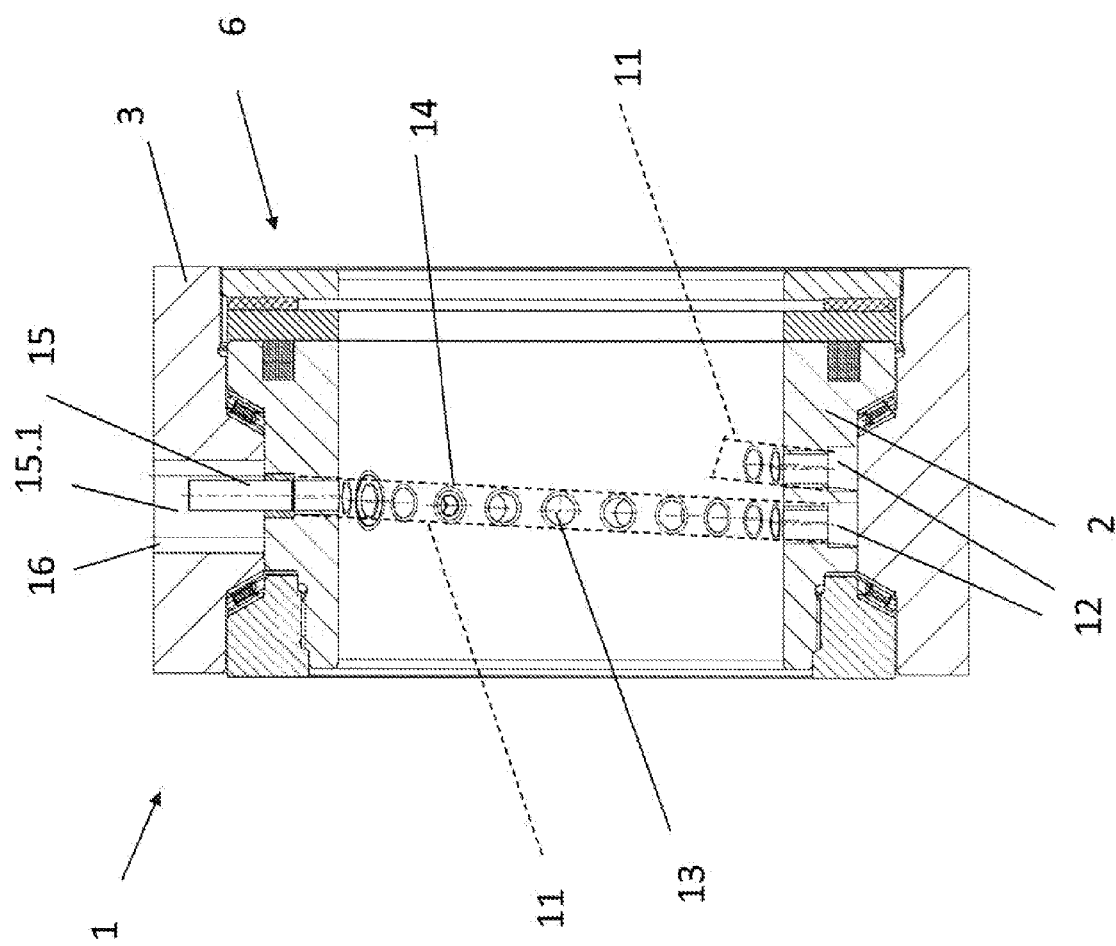
FIG. 2 a rotary joint with braking function.

The rotary joint 1 shown in FIG. 2 is also provided with a brake device 6 that provides for a mutual, temporary fixing of the bearing inner ring 2 relative to the bearing outer ring 3 and corresponds to the brake device 6 according to FIG. 1.

It can be clearly seen from the representation in FIG. 2 that a helical raceway 11 is formed on the bearing inner ring 2. For the sectional view selected in FIG. 2, this is visible especially in the lower part of the bearing inner ring 2 in the figure, where two sections 12 of the single-track raceway 11 are arranged one next to the other in the axial direction.

The helical form of the raceway 11 is also especially clear in FIG. 3 that shows a bearing inner ring 2 according to FIG. 2 in side view. There it is also visible that, for the axial extent of the helical form of the one-track raceway 11, with a view in the direction of the rotational axis D, the raceway 11 is at least partially covered.

As further shown in FIG. 2, a plurality of holes open into the raceway 11, wherein these holes are formed as threaded holes 13. A stop 14 in the form of a threaded pin is screwed into one of these threaded holes 13. The length of this threaded pin is dimensioned so that this projects in the screwed-in state into the raceway 11 (not shown in FIG. 2). Only for the sake of completeness it is noted that another stop 14 in the form of a threaded pin is also present, which, however, is not visible due to the section view in FIG. 2.

A tab 15 connected to the bearing outer ring 3 also engages in the raceway 11, wherein this tab is arranged in FIG. 2 on a slide 15.1. To guarantee that the tab 15 or the slide 15.1 can follow the path specified by the helical raceway 11 extending in the axial direction for the rotation of the bearing outer ring 3 and bearing inner ring 2, the tab 15 or the slide 15.1 is arranged in a guide 16 that allows the tab 15 or the slide to move in the axial direction in the bearing outer ring 3.

While the embodiments here show rotary joints 1 with a brake device 6, this brake device 6 is not absolutely required. Instead, the helical raceway 11 could also be inserted into a rotary joint that has no brake device 6 in another, not shown embodiment.

Rotary joints 1 according to the invention can be especially advantageous in medical technology, for example, for use in rotating mounts for examination tables or ceiling stands.

LIST OF REFERENCE NUMBERS

1 Rotary joint
2 Bearing inner ring
3 Bearing outer ring
4 Rolling body
5.1, 5.2 End side
6 Braking device
7 Brake disk
8 Brake pad
9 Spring
10 Electromagnet
11 Raceway
12 Section
13 Threaded hole
14 Stop
15 Tab
15.1 Slide
16 Guide

The invention claimed is:

1. A rotary joint comprising a bearing inner ring, a bearing outer ring, rolling bodies that roll between the bearing rings, a path limiting device that limits a mutual rotation of the bearing outer ring relative to the bearing inner ring and comprises a helical raceway with stops and a tab that projects radially into the raceway circumferentially between the stops.

2. The rotary joint according to claim 1, wherein the helical raceway extends in a direction of a rotational axis (D) of the rotary joint.

3. The rotary joint according to claim 2, wherein the raceway is provided with a plurality of threaded holes and the stops are screwable into the threaded holes.

4. The rotary joint according to claim 3, wherein the plurality of the thread holes are circumferentially arranged around an entire periphery of the raceway.

5. The rotary joint according to claim 2, wherein the bearing inner ring and the bearing outer ring each have two end sides, the rotary joint further comprising a braking device that prevents mutual rotation on the two end sides of the bearing inner ring and the bearing outer ring pointing in a same direction, wherein the braking device includes one of the bearing rings having a brake disk and the other of the bearing rings having a brake pad displaceable in an axial direction against the brake disk.

6. The rotary joint according to claim 1, wherein the rotary joint is for a medical device.

\* \* \* \* \*